(12) United States Patent  
Paumier

(10) Patent No.: US 6,435,234 B1
(45) Date of Patent: Aug. 20, 2002

(54) SELF CONTAINED STUMP GRINDER

(75) Inventor: James J. Paumier, North Canton, OH (US)

(73) Assignee: New River Equipment, Canton, OH (US)

(*) Notice: Subject to any disclaimer, the term of this patent is extended or adjusted under 35 U.S.C. 154(b) by 0 days.

(21) Appl. No.: 09/717,952

(22) Filed: Nov. 21, 2000

Related U.S. Application Data

(60) Provisional application No. 60/166,798, filed on Nov. 22, 1999.

(51) Int. Cl.⁷ .............................................. A01G 23/06
(52) U.S. Cl. ...................... 144/24.12; 37/302; 144/334
(58) Field of Search ....................... 37/301, 302, 189; 144/24.12, 334, 218; 241/101.73, 101.74, 101.72

(56) References Cited

U.S. PATENT DOCUMENTS

| 1,467,430 | A | * | 9/1923 | Hurd | 144/24.12 |
| 2,887,134 | A | * | 3/1959 | Bartlett | 144/24.12 |
| 3,198,224 | A | | 8/1965 | Hiley | 144/24.12 |
| 3,818,957 | A | | 6/1974 | Schoonover | 144/34.1 |
| 3,911,979 | A | * | 10/1975 | Rousseau | 144/24.12 |
| 3,931,841 | A | | 1/1976 | Blüm | |
| 4,100,688 | A | | 7/1978 | Grist | 37/117.5 |
| 4,355,670 | A | | 10/1982 | Ohrberg et al. | 144/34.1 |
| 4,681,145 | A | * | 7/1987 | York | 144/24.12 |
| 5,158,126 | A | | 10/1992 | Lang | 144/375 |
| 5,419,380 | A | | 5/1995 | Bot | 144/334 |
| 5,423,137 | A | | 6/1995 | Cochran | 37/408 |
| 5,499,771 | A | | 3/1996 | Esposito et al. | 241/101.74 |
| 5,555,652 | A | | 9/1996 | Ashby | 37/189 |
| 6,021,825 | A | | 2/2000 | Bowling | 144/24.12 |

* cited by examiner

Primary Examiner—W. Donald Bray
(74) Attorney, Agent, or Firm—Frederick K. Lacher; Roger D. Emerson

(57) ABSTRACT

A disc cutter is rotatably mounted on a self-contained power unit which is detachably mounted on lift arms of a hydraulic excavator for locating the disc cutter at a position on the opposite side of a stump from the excavator and providing curling movement of the rotating disc cutter through the stump towards the excavator in the line of sight of the operator for discharging the debris away from the operator.

10 Claims, 4 Drawing Sheets

SELF CONTAINED STUMP GRINDER

This application claims the benefit of provisional application 60/166,798 filed Nov. 22, 1999.

TECHNICAL FIELD

This invention relates to a self-contained stump grinding apparatus with a rotating disc cutter for mounting on hydraulic excavator lift arms so that the cutting face of the disc cutter is in the line of sight of the operator and the weight of the engine is utilized to stabilize the grinding movement.

BACKGROUND ART

A stump grinding apparatus with a quick connection to an excavator for moving the stump grinder to a position adjacent a stump and with the cutter head being moveable independently of the excavator boom is shown in U.S. Pat. No. 6,021,825. However, there is no provision for utilizing the excavator boom to control the cutting operation. In addition, the combined weight of the stump grinding apparatus is not utilized to absorb vibration and stabilize the grinder during the stump grinding operation.

A self contained tree stump grinder as shown in U.S. Pat. No. 5,419,380 includes a sled supported grinder which is placed by a backhoe excavator boom at a position adjacent a tree stump and dragged over the stump towards the backhoe during the grinding operation. The stump is between the operator and the cutter until the cutter reaches the edge of the stump at which time the debris is directed toward a guard between the operator and the cutter. The operator therefore does not know how effective the cutter is until it is lifted off the stump which makes it difficult to pull the cutter over the stump at an optimum speed. The grinder cannot grind stumps over the width of the grinding drum located between the sled runners and the grinding depth is limited by the height of the runners.

The grinding of stumps with a rotating disc cutter on the end of lift arms of a vehicle is shown in U.S. Pat. No. 3,818,957. The disc cutter is mounted on a boom close to the vehicle so that it can be tilted to maintain the position of the disc cutter facing the ground and with the operator shielded from the debris by the vehicle. One of the difficulties is that the operator cannot observe the cutting action without backing the vehicle away from the cut area. Also the debris is directed towards the vehicle unless multiple discs are used and a chute is provided to collect the chips and deposit them alongside the vehicle in a windrow. Two cutting wheels are proposed to grind up brush landing on top the generally horizontal disc.

SUMMARY OF THE INVENTION

The present invention is directed to a self-contained stump grinder attachment to a stick lift arm of a hydraulic excavator or other construction and forestry machines and to a method of grinding stumps where the operator can observe the grinding operation with a minimum risk of flying debris. By incorporating a rotating disc cutter with cutting teeth on one face, the full face of the disc can be utilized to cut through a tree stump. Also the disc cutter has a diameter greater than the width of the other parts of the self-contained grinder so that the disc will cut a path completely through the stump which results in a minimum of passes. The cutter engine driving the disc cutter is mounted in the same manner as an excavator bucket is mounted and is operated in a similar manner reducing the training time for an operator. During operation, the cutting face of the disc cutter is in the line of sight of the operator because the disc is rotated about an axis close to the line of sight and the debris is directed away from the axis. Also, the weight of the cutter engine stabilizes the movement of the cutter during the grinding operation. With wireless controls of the engine in the self-contained unit and use of a quick coupler unit, the stump grinder of the invention may be picked up and be in operation without the operator leaving the excavator.

It is understood that the cutter engine may be an electric motor or a hydraulic motor where there is a source of adequate hydraulic or electric power.

In accordance with one aspect of the invention there is provided a method of grinding a tree stump with a rotating disc cutter on a rotatable shaft of a power unit mounted on a grinder frame supported by lift arms of an excavator where an operator is located on the excavator characterized by moving the left arms to locate the rotating disc cutter at a position on the opposite side of the tree stump from the excavator, tilting the frame to incline the shaft toward the excavator so that a cutting face of the rotating cutter disc is in the line of sight of the operator on the excavator, moving the rotating disc cutter toward the excavator in cutting engagement with the stump and advancing the rotating disc cutter through the stump so that debris is discharged radially to one side and away from the operator.

In accordance with another aspect of the invention there is provided a stump grinding apparatus comprising a power unit having a rotatable disc cutter mounted on a first lift arm, the first lift arm being pivotally mounted on a second lift arm, the second lift arm being pivotally mounted on an excavator platform, the platform being rotatable about a generally vertical axis, first power means for lifting and lowering of the first lift arm, second power means for lifting and lowering of the second lift arm to provide curling movement of the power unit and the cutter disc toward and away from the platform and maintain an axis of rotation of the disc cutter inclined in a direction toward the excavator platform whereby debris from cutting rotation of the disc cutter will be discharged in a direction away from the platform.

DETAILED DESCRIPTION OF THE INVENTION

Figure 1:
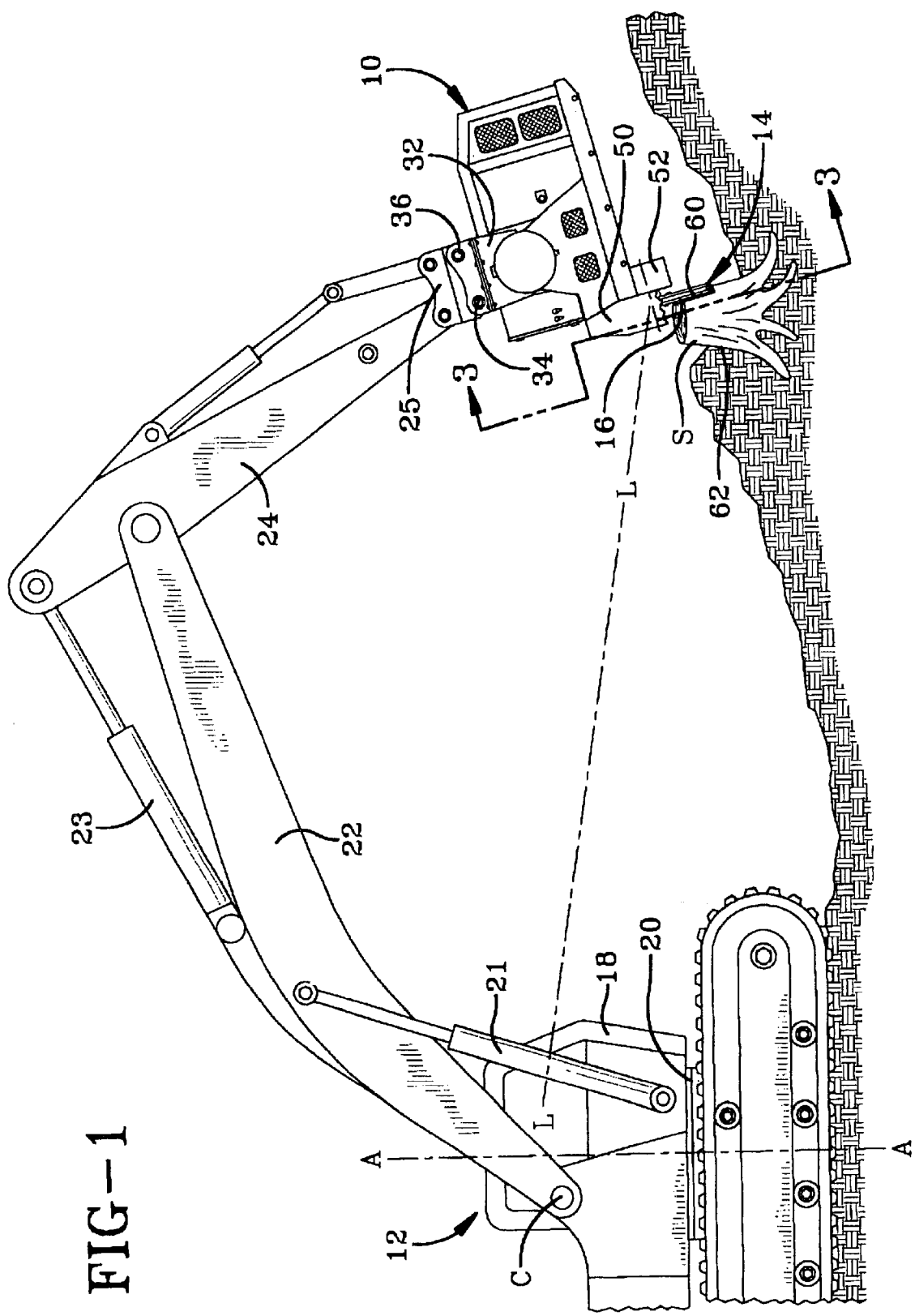
FIG. 1 is a side elevation of a stump grinder embodying the invention mounted on a hydraulic excavator.

Referring to FIG. 1, a self-contained stump grinder 10 embodying the invention is shown mounted on a hydraulic excavator 12. The grinder 10 has a rotating disc cutter 14 having a cutting face 16 which is maintained in a line of sight L—L of the operator seated in a housing 18 of the excavator 12. The housing 18 is mounted on a platform 20 rotatable with a counterweight about a relatively vertical axis A—A on which a first lift arm such as a boom 22 is pivotally mounted. A second lift arm such as a stick 24 is pivotally mounted on the boom 22 and pivotally connected to the grinder 10 through a quick coupling connector 25. A first power means such as first hydraulic piston cylinder assembly 21 is connected to the platform 20 and boom 22 for controlling curling action of the boom 22 about an axis C—C. A second power means such as second hydraulic piston cylinder assembly 23 is connected to the boom 22 and stick 24 for curling of the stick. A third power means such as a bucket hydraulic piston cylinder assembly is connected to the quick coupling connector 25.

Figure 2:
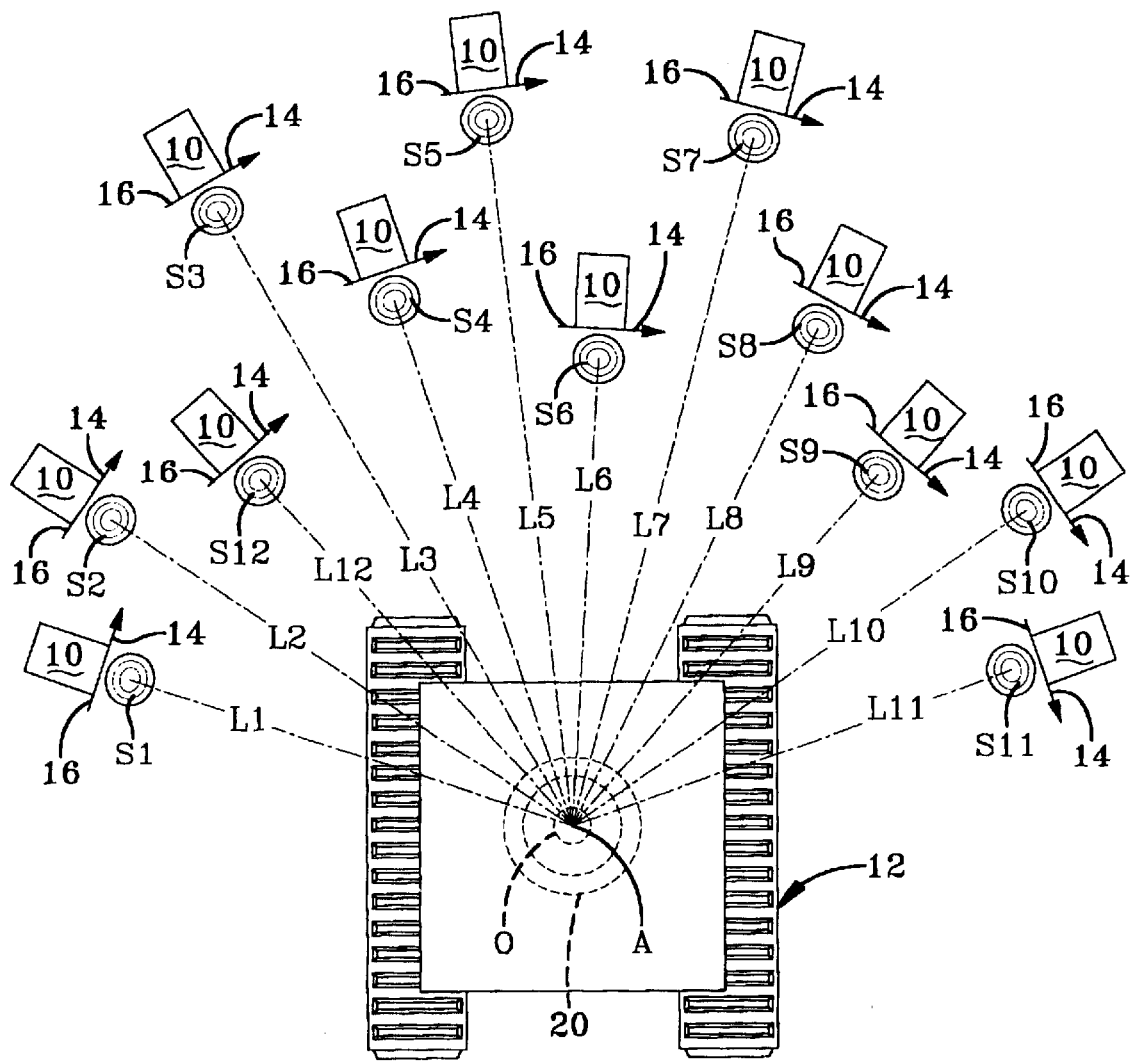
FIG. 2 is a schematic plan view of an area of forested land with tree stumps located within the reach of the lift arms of an excavator showing the positions of the self-contained stump grinder of this invention for grinding the stumps and the line of sight of the operator to each stump being ground.

The boom 22 and stick 24 are operable to move the grinder 10 in a direction along the line of sight L—L to positions from 10 to 30 feet (3.048 to 9.14 meters) from the excavator 12 to grind stumps S located in a 360° area around the excavator as shown in FIG. 2. The stump positions are designated S1 through S12 for example. In each one of these positions S1—S12 the lines of sight L—L of the operator O are designated L1 -through L12 and are substantially perpendicular to the cutting face 16 of the disc cutters 14 whereby the debris resulting from the cutting operation is deflected to the ground and to one side of the grinder 10 as shown by the arrows in FIG. 2. Accordingly, the debris is directed away from the operator O in all positions of operation.

Figure 3:
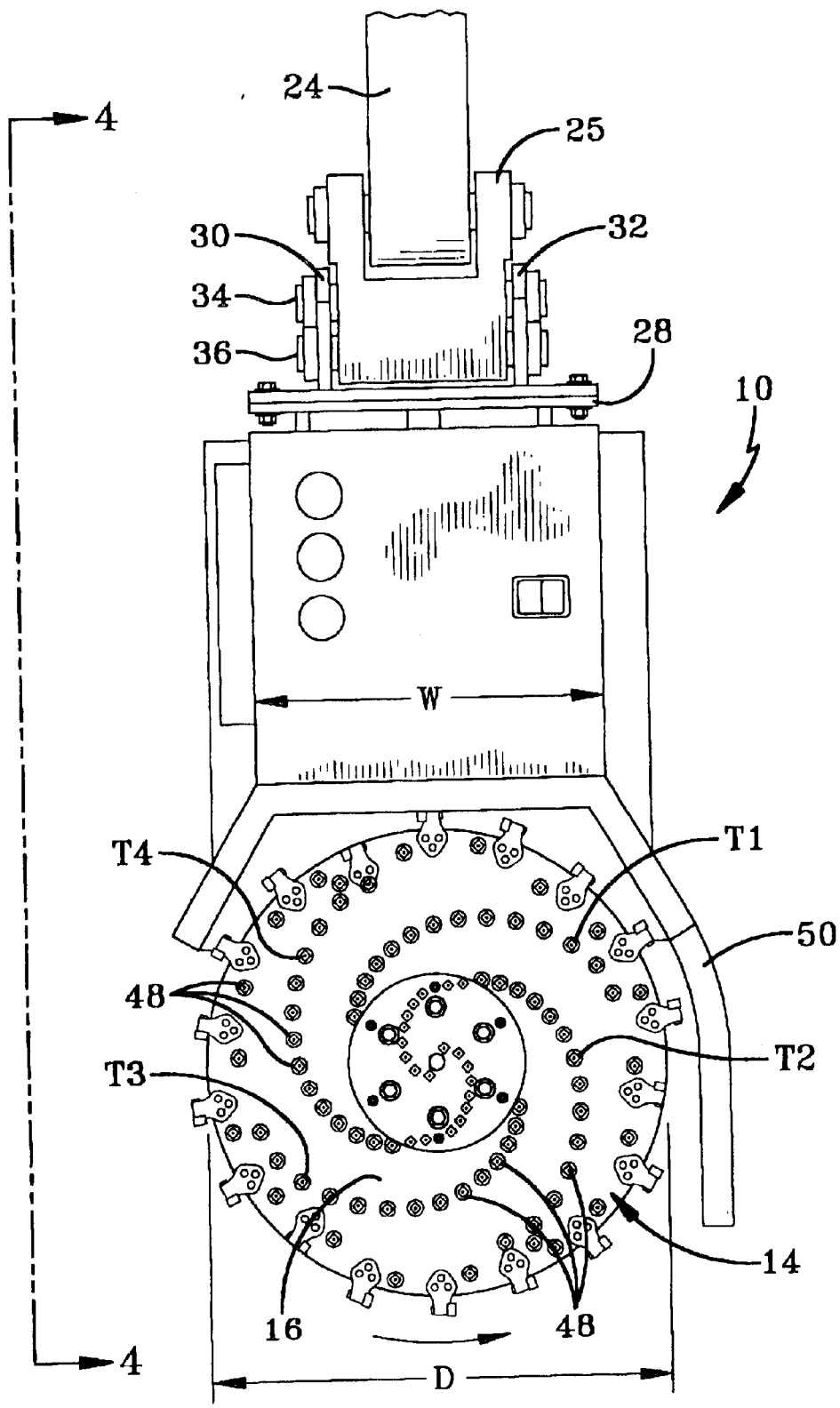
FIG. 3 is an enlarged elevation of the self-contained stump grinder shown in FIG. 1 taken along line 3—3 in FIG. 1.
Figure 4:
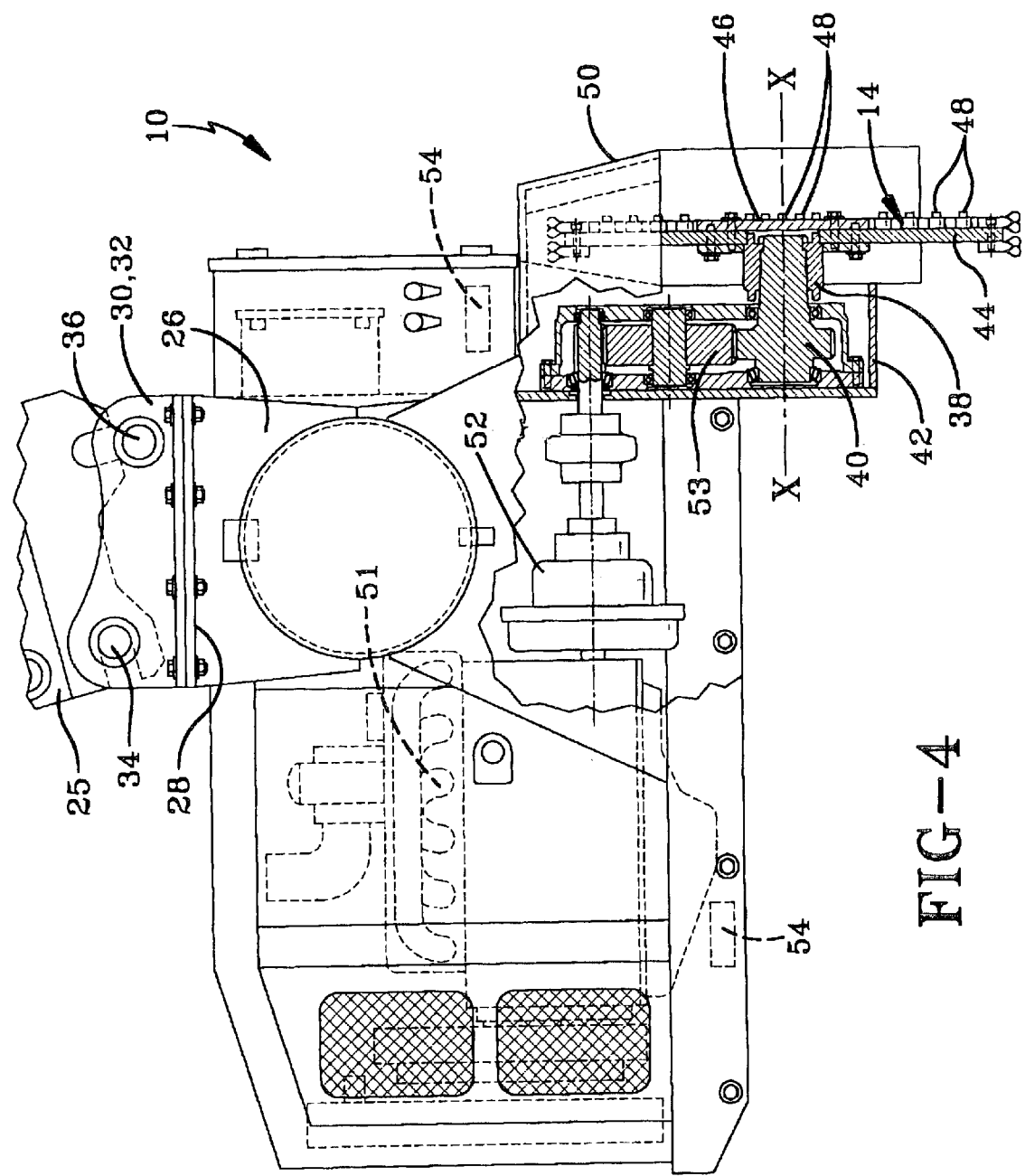
FIG. 4 is an elevation of the self-contained stump grinder taken along line 4—4 in FIG. 3.

Referring to FIGS. 3 and 4, the self-contained grinder 10 is shown in greater detail and includes a frame 26 having a bulkhead 28 with plates 30 and 32 connected by spaced apart pins 34 and 36 adapted for receiving the quick connecting coupler 25 which is of a type well-known in the art for connecting lift arms to a bucket. The frame 26 has a width W which is less than the diameter D of the disc cutter 14. This is important in that the grinder 10 can be used in a manner very similar to the curling operation of a digging bucket where the cutting edge is moved in a continuous path.

The disc cutter 14 is mounted on a drive hub 38 splined to an output shaft 40 rotatable in a gearbox 42. A set of large bearings (not shown) in the gear box 42 support the output shaft 40 at the end in the gear box 42. The main disc 44 is bolted to the drive hub 38. A second smaller diameter disc 46 is bolted to the face of the main disc 44. Field replaceable carbide teeth 48 cover the entire front periphery and part of the rear of the discs 44 and 46. The teeth 48 are positioned in spiral rows T1, T2, T3 and T4 as shown in FIG. 3 and in a circular row T5 around the periphery of the main disc 44.

A flex mounted shield 50 is mounted on the frame 26 around the leading edge of the disc 44 for deflecting debris and may extend to the ground.

Totally within the frame 26 is a power unit 51 which may include the radiator, fuel tank, diesel engine, fluid coupler 52 and a drop box gear reducer 53. By locating the gear reducer 53 in a drop box, the axis X—X of the disc cutter 14 is lowered and space is provided for ejecting the debris as the grinder 10 is moved through a stump S as shown in FIG. 1. The fluid coupler 52 is important for cushioning the drive to protect the engine and engine components from shock torque loads and stalling of the engine due to extreme variations in the torque load applied when grinding stumps. Also, by positioning the gear reducer 53 and fluid coupler 52 at positions spaced from the engine the engine is protected from damaging forces from the disc cutter 14.

Mounted on the frame 26 is a shut down system 54 having internally mounted monitors registering the degree of tilt of the grinder 10 and connected to the engine for shutting down the engine at a predetermined tilt angle of from 40° to 46° for example to prevent damage to the engine due to lack of lubrication. This may include an adjustable dual axis threshold angle detector to protect the engine from excessive pitch and roll angles.

In operation the self-contained grinder 10 may be transported to a work site separately from the hydraulic excavator 12. When needed for stump removal, the operator may actuate the hydraulic quick coupler 26 to replace a bucket used to clear the land with the self-contained grinder 10. The grinder 10 is lifted by the lift arms 22 and 24 and through the wireless controls the engine 52 is started. The disc grinder 14 is rotated and the grinder 10 may then be moved by the first lift arm 22 and second lift arm 24 to a position on a back side 60 of the stump S to a position on the front side 62 as shown in FIG. 1. The cutting face 16 of the disc cutter 14 is in the line of sight L—L of the operator. The grinder 10 is then manipulated by the first and second piston cylinder assemblies 21, 23 and the bucket cylinder in the same manner as a bucket mounted on the first lift arm 22 and second lift arm 24 would be manipulated. The grinder 10 is rotated and moved toward the excavator 12 causing the disc cutter 14 to engage the back side 60 of the stump S and grind the stump with the carbide teeth 48. The combined mass of the frame 26, power unit 5 and disc cutter 14 serves to absorb the vibration from cutting and stabilize the grinder 10. The debris is directed toward the ground and in a direction away from the operator in the cab 18 as shown by the arrows in FIG. 2.

Because the diameter D of the disc cutter 14 is greater that the width W of the grinder frame 26, the disc cutter can pass completely through the stump S and is not limited to grinding stumps of diameters less than the width of the grinder or requiring several passes.

As shown in FIG. 2, the grinder 10 of this invention may be used to grind many stumps S1–S14 without moving the excavator. In the example shown, the lift arms 22 and 24 have an extended reach of 30 feet (9.144 meters) and therefore the grinder may be effectively used for grinding stumps within 30 feet (9.144 meters) of the excavator.

The grinder 10 may also be mounted on an articulated loader by modifying the positions of the plates 30 and 32 for engagement with the booms of the loader. Then in operation the booms are manipulated by the sidewise movement of the front articulated wheels to push the grinder wheel against a stump.

While a certain representative embodiment and details have been shown for the purpose of illustrating the invention, it will be apparent to those skilled in the art that various changes and modifications may be made therein without departing from the scope of the invention.

What is claimed is:

1. A method of rotating a tree stump with a rotating disc cutter on a rotatable shaft of a power unit mounted on a grinder frame supported by lift arms of an excavator where an operator is located on the excavator characterized by said grinder frame being supported on one of said lift arms by spaced apart pins moving said lift arms to locate said rotating disc cuter at a position on the opposite side of said tree stump from said excavator, tiling said frame by controlled curling action of said lift arms to incline said shaft toward said excavator so that a cutting face of said rotating cutter disc is in the line of sight of said operator on said excavator, moving said rotating disc cutter toward said excavator in cutting engagement with said stump and advancing said rotating disc cutter through said stump so that debris is discharged radially to one side and away from said operator.

2. The method of claim 1 wherein said spaced apart pins are adapted to receive a quick connecting coupler further characterized by connecting said lift arms to said grinder frame with said quick connecting coupler prior to moving said lift arms to locate said rotating disc cutter.

3. The method of claim 1 wherein said curling action of said lift arms is controlled by hydraulic piston cylinder assemblies characterized by extending and retracting said assemblies to tilt said grinder frame and advance said rotating disc cutter through said stump.

4. The method of claim 3 wherein said curling action of said arms includes curling movement of said grinder frame due to actuation of said hydraulic piston cylinder assemblies whereby said cutter disc is maintained in cutting engagement with said stump and advanced in a direction toward said operator on said excavator.

5. A stump grinding apparatus comprising a power unit having a rotatable disc cutter mounted on a first lift arm, said first lift arm being pivotally mounted on a second lift arm, said second lift arm being pivotally mounted on an excavator platform, said platform being rotatable about a generally vertical axis, first power means for lifting and lowering said first lift arm, second power means for lifting and lowering said second lift arm to provide curling movement of said power unit and said cutter disc toward and away from said platform and maintain an axis of rotation of said disc cutter inclined in a direction toward said excavator platform whereby debris from cutting rotation of said disc cutter will be discharged in a direction way from said platform.

6. The stump grinding apparatus of claim 5 further characterized by said disc cutter having a disc cutting face with a plurality of grinding units from engaging a stump.

7. The stump grinding apparatus of claim 5 further characterized by said power unit including an engine connected to a gear reducer having a shaft supporting said disc cutter with said gear reducer being located in a drop box to lower the axis of rotation of said disc cutter and provide space for ejecting debris from said grinder.

8. The stump grinding apparatus of claim 7 further characterized by a fluid coupler being positioned between said engine and said gear reducer for cushioning said engine from shock torque loads during operation.

9. The stump grinding apparatus of claim 6 further characterized by said disc cutter having a splined drive hub on a face of said disc cutter opposite said disc cutting face for meshing with a splined end of said shaft.

10. The stump grinding apparatus of claim 9 further characterized by said cutter disc having a diameter greater than the width of said gear box.

\* \* \* \* \*

UNITED STATES PATENT AND TRADEMARK OFFICE
CERTIFICATE OF CORRECTION

PATENT NO. : 6,435,234 B1
DATED : August 20, 2002
INVENTOR(S) : James Paumier

It is certified that error appears in the above-identified patent and that said Letters Patent is hereby corrected as shown below:

<u>Column 4,</u>
Line 52, "Rotating" should be -- grinding. --
Line 58, "cuter" should be -- cutter --.
Line 59, "tiling" should read -- tilting --.

Signed and Sealed this

Fourteenth Day of January, 2003

JAMES E. ROGAN
*Director of the United States Patent and Trademark Office*